US012697826B2

(12) United States Patent
Ohara

(10) Patent No.: US 12,697,826 B2
(45) Date of Patent: Aug. 4, 2026

(54) IMAGE READING DEVICE

(71) Applicant: SEIKO EPSON CORPORATION, Tokyo (JP)

(72) Inventor: Toshimitsu Ohara, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 19 days.

(21) Appl. No.: 18/912,888

(22) Filed: Oct. 11, 2024

(65) Prior Publication Data

US 2025/0121615 A1 Apr. 17, 2025

(30) Foreign Application Priority Data

Oct. 13, 2023 (JP) ................................ 2023-177342

(51) Int. Cl.
*B41J 11/18* (2006.01)
*B41J 11/04* (2006.01)

(52) U.S. Cl.
CPC ................ *B41J 11/18* (2013.01); *B41J 11/04* (2013.01)

(58) Field of Classification Search
CPC .... B41J 11/18; H04N 1/1061; H04N 1/00551
See application file for complete search history.

(56) References Cited

U.S. PATENT DOCUMENTS 5,574,542 A * 11/1996 Brook, III ................ H04N 1/10 355/75
6,405,017 B1 6/2002 Takahashi
6,697,600 B2 * 2/2004 Nishikino ............ G03G 15/605 399/380
7,512,374 B2 * 3/2009 Ono ..................... G03G 15/602 399/365
9,319,545 B2 * 4/2016 Oizumi .............. H04N 1/00559
11,463,601 B2 * 10/2022 Migita ................. H04N 1/1065

FOREIGN PATENT DOCUMENTS

JP 2001-075194 3/2001
JP 2001312016 A * 11/2001
JP 3677726 B2 * 8/2005
JP 2007060143 A * 3/2007
JP 2015203260 A * 11/2015

* cited by examiner

*Primary Examiner* — Christle I Marshall
(74) *Attorney, Agent, or Firm* — WORKMAN NYDEGGER

(57) ABSTRACT

The present disclosure includes a cover portion configured to be switchable between a closed state, and an open state, and a pressing portion provided at the cover portion, and configured to press an original document placed at the original document platen when the cover portion is in the closed state, the pressing portion includes an elastic portion bonded to a bottom portion of the cover portion, a sheet material attached to the elastic portion, and coming into contact with the original document placed at the original document platen when the cover portion is in the closed state, a bonding portion for bonding the cover portion and the elastic portion, a bonding inhibiting portion interposed between the bonding portion and the cover portion, and inhibiting the bonding between the cover portion and the elastic portion, and the bonding inhibiting portion is provided at an end portion of the bonding portion.

10 Claims, 6 Drawing Sheets

IMAGE READING DEVICE

The present application is based on, and claims priority from JP Application Serial Number 2023-177342, filed Oct. 13, 2023, the disclosure of which is hereby incorporated by reference herein in its entirety.

BACKGROUND

1. Technical Field

The present disclosure relates to an image reading device that reads an image of an original document.

2. Related Art

As disclosed in JP 2001-075194 A, an image reading device for reading an image of an original document is provided with an original document pressure plate for pressing the original document placed on a contact glass. The original document pressure plate is provided with a pressure plate body, a pressure contact sheet member coming into contact with the original document, and an elastic plate member arranged between the pressure plate body and the pressure contact sheet member. The elastic plate member is formed of an open-cell foam.

Four corners of the elastic plate member are each provided with a fixing portion constituted by a double-sided tape, and the elastic plate member is fixed to the four corners of the pressure plate body by the fixing portions.

In the configuration described in JP 2001-075194 A, when it becomes necessary to remove the elastic plate member from the pressure plate body, it is necessary to peel off the fixing portions from the pressure plate body. At this time, there is a risk that the elastic plate member is torn and the elastic plate member cannot be reused.

SUMMARY

An image reading device according to the present disclosure for solving the above-described problems includes an original document platen at which an original document is placeable, a reading unit configured to read the original document placed at the original document platen, a cover portion configured to be switchable between a closed state for covering the original document platen, and an open state for opening the original document platen, and a pressing portion provided at the cover portion, and configured to press the original document placed at the original document platen when the cover portion is in the closed state, wherein the pressing portion includes an elastic portion bonded to a bottom portion of the cover portion, a sheet material attached to the elastic portion, and coming into contact with the original document placed at the original document platen when the cover portion is in the closed state, a bonding portion for bonding the cover portion and the elastic portion, and a bonding inhibiting portion interposed between the bonding portion and the cover portion, and inhibiting the bonding between the cover portion and the elastic portion, and the bonding inhibiting portion is provided at an end portion of the bonding portion.

DESCRIPTION OF EMBODIMENTS

Figure 1:
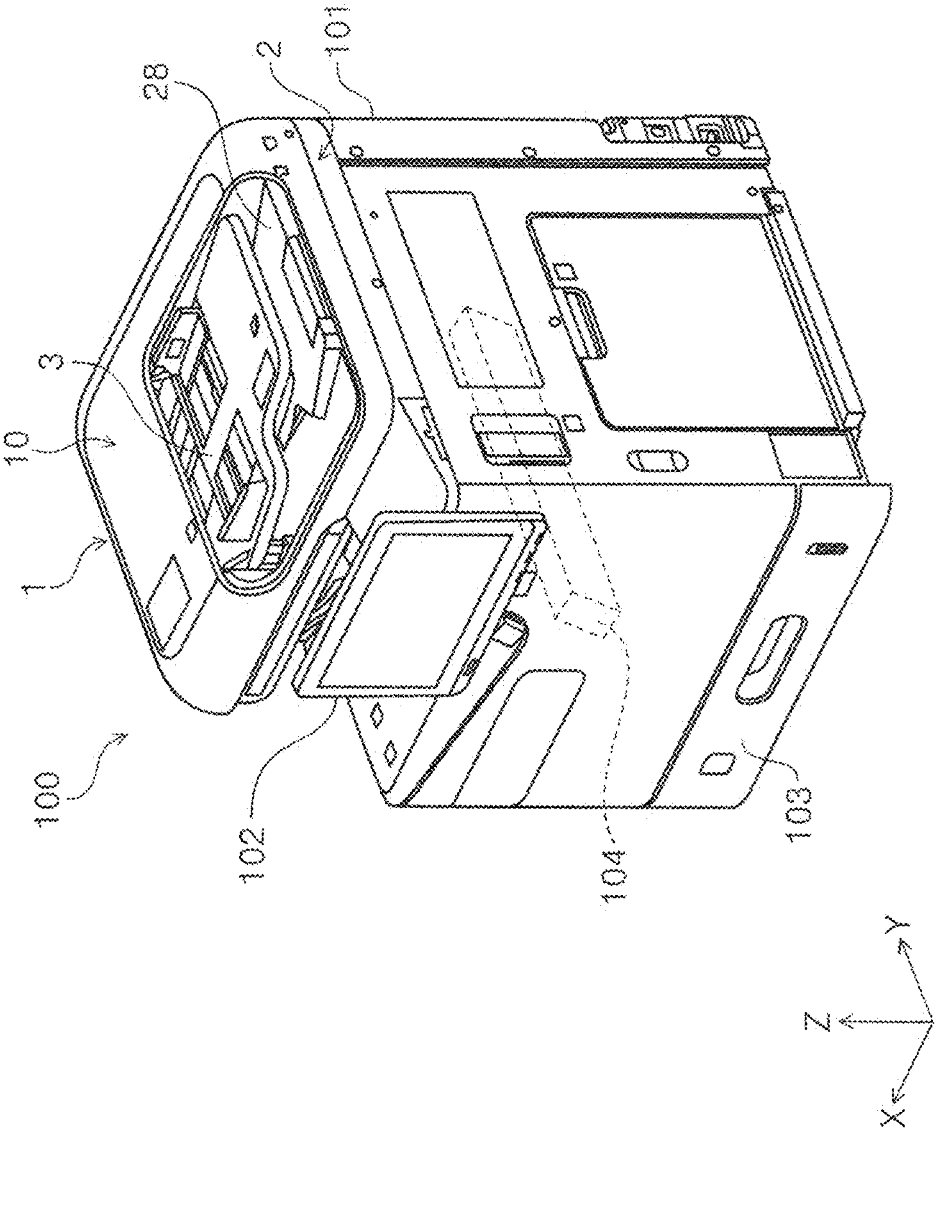
FIG. 1 is an external perspective view of a printer.

The present disclosure will be schematically described below.

An image reading device according to a first aspect includes an original document platen at which an original document is placeable, a reading unit configured to read the original document placed at the original document platen, a cover portion configured to be switchable between a closed state for covering the original document platen, and an open state for opening the original document platen, and a pressing portion provided at the cover portion, and configured to press the original document placed at the original document platen when the cover portion is in the closed state, wherein the pressing portion includes an elastic portion bonded to a bottom portion of the cover portion, a sheet material attached to the elastic portion, and coming into contact with the original document placed at the original document platen when the cover portion is in the closed state, a bonding portion for bonding the cover portion and the elastic portion, and a bonding inhibiting portion interposed between the bonding portion and the cover portion, and inhibiting the bonding between the cover portion and the elastic portion, and the bonding inhibiting portion is provided at an end portion of the bonding portion.

According to the present aspect, since the bonding inhibiting portion that is interposed between the bonding portion and the cover portion, and inhibits the bonding between the cover portion and the elastic portion is provided at the end portion of the bonding portion, the elastic portion can be peeled off from the cover portion with the bonding inhibiting portion as the starting point while the bonding portion is maintained in a state of being bonded to the elastic portion. Accordingly, it is possible to prevent the elastic portion from being torn when the elastic portion is peeled off from the cover portion.

A second aspect is an aspect dependent at the first aspect, wherein the pressing portion has a longitudinal direction and a short direction, the bonding portion extends in the longitudinal direction, and the bonding inhibiting portion is provided at at least one of one end portion and another end portion in the longitudinal direction of the bonding portion.

In the configuration in which the pressing portion has the longitudinal direction and the short direction, and the bonding portion extends in the longitudinal direction, when the elastic portion is peeled off from the cover portion along the longitudinal direction, workability is improved.

According to the present aspect, in such a configuration, since the bonding inhibiting portion is provided at at least one of the one end portion and the other end portion in the longitudinal direction of the bonding portion, it is possible to peel off the elastic portion from the cover portion with easy workability with the bonding inhibiting portion as the starting point.

A third aspect is an aspect dependent at the second aspect, wherein the bottom portion of the cover portion includes a rib that is bonded to the bonding portion and extends along the longitudinal direction, and a plurality of the ribs are provided at intervals in the short direction.

Since the bonding portion is bonded to the rib provided at the bottom portion, the bonding portion can be easily peeled off from the bottom portion. In addition, since the plurality of ribs are provided at intervals in the short direction, bonding strength can be ensured.

A fourth aspect is an aspect dependent at the second aspect, wherein a plurality of the bonding portions are provided at intervals in the short direction.

According to the present aspect, since the plurality of bonding portions are provided at intervals in the short direction, it is possible to reliably bond the elastic portion to the cover portion.

Note that the present aspect may also be dependent on the above-described third aspect, not only on the above-described second aspect.

A fifth aspect is an aspect dependent on the first aspect, wherein the bonding inhibiting portion is formed of a sheet material.

According to the present aspect, since the bonding inhibiting portion is formed of the sheet material, it is possible to easily achieve the bonding inhibiting portion with a simple configuration. In addition, since the bonding inhibiting portion is the sheet material, it is possible to suppress influence on a thickness of the pressing portion and to appropriately press an original document.

Note that the present aspect may also be dependent on any one of the above-described second to fourth aspects, not only on the above-described first aspect.

A sixth aspect is an aspect dependent on the first aspect, wherein the cover portion includes a conveyance unit capable of conveying the original document.

According to the present aspect, in the configuration in which the cover portion includes the conveyance unit capable of conveying the original document, the operational effects of the above-described first aspect can be obtained.

Note that the present aspect may also be dependent on any one of the above-described second to fifth aspects, not only on the above-described first aspect.

A seventh aspect is an aspect dependent on the sixth aspect, wherein the cover portion includes a detachable portion that is detachable, and at least a part of the pressing portion overlaps at least a part of the detachable portion when viewed from a normal direction relative to a surface of the sheet material.

In the configuration in which at least a part of the pressing portion overlaps at least a part of the detachable portion when viewed from the normal direction relative to the surface of the sheet material, it is necessary to remove the pressing portion when the detachable portion is attached or detached. At this time, due to the operational effects of the first aspect described above, it is possible to prevent the elastic portion from being torn when the elastic portion is peeled off from the cover portion.

Note that in the present specification, “at least a part” may mean either a part or an entirety.

An eighth aspect is an aspect dependent on the seventh aspect, wherein the detachable portion is the reading unit.

According to the present aspect, in the configuration in which the detachable portion is the reading unit, the operational effects of the above-described seventh aspect can be obtained.

A recording device according to a ninth aspect includes a device main body including a recording unit that performs recording on a medium, and the image reading device according to any one of the first to eighth aspects provided at an upper portion of the device main body.

According to the present aspect, the operational effects of any one of the first to eighth aspects described above can be obtained in the recording device including the above image reading device.

The present disclosure will be specifically described below.

An inkjet printer 100 illustrated in FIG. 1 is an example of a recording device that performs recording on a medium (not illustrated) and includes an ink ejection head 104 inside a printer body 101, the ink ejection head 104 ejecting ink onto the medium. The ink ejection head 104 is an example of a recording unit that performs recording on the medium.

A medium storage cassette 103 is provided at a bottom portion of the printer body 101, and the medium is transmitted from the medium storage cassette 103 to a position facing the ink ejection head for recording. An operation panel 102 is provided at a front surface of the device and receives various operation settings by a user.

A scanner 1, which is an example of an image reading device, is provided at an upper portion of the printer body 101. That is, the inkjet printer 100 is a multifunction machine that has an image reading function of reading images of original documents, in addition to a recording function of performing recording on the medium.

Note that an X-Y-Z coordinate system illustrated in each drawing is a rectangular coordinate system in which a Y-axis direction is a depth direction of the device, a +Y direction of the Y-axis direction is a direction from the front surface of the device to a rear surface of the device, and a −Y direction is a direction from the rear surface of the device to the front surface of the device.

An X-axis direction is a width direction of the device, and when viewed from an operator of the inkjet printer 100, a +X direction is a left side and a −X direction is a right side. A Z-axis direction is a vertical direction, a +Z direction in the Z-axis direction is an upward direction, and a −Z direction is a downward direction.

Note that in an original document conveyance unit 10, which is an example of a cover portion to be described below, the Y-axis direction is a width direction of an original document. In the original document conveyance unit 10, a direction in which the original document is sent may be referred to as “downstream”, and an opposite direction may be referred to as “upstream”.

The scanner 1 includes a scanner main body 2 and the original document conveyance unit 10. The original document conveyance unit 10 is rotatably provided relative to the scanner main body 2 via a hinge (not illustrated), and rotates to open and close an original document platen glass 41 (see FIG. 2) of the scanner main body 2. The original document conveyance unit 10 is an example of a cover portion that can be switched between a closed state (FIGS. 1 and 2) for covering the original document platen glass 41 and an open state (not illustrated) for opening the original document platen glass 41.

Note that the hinge is provided at a rear of the device, and a rotation axis of the hinge is parallel to the X-axis direction, whereby the original document conveyance unit 10 rotates with a front side of the device as a free end.

The original document conveyance unit 10 includes an original document placing portion 3, and delivers an original document P (see FIG. 2), which is an example of a medium placed on the original document placing portion 3, in the +X direction. The original document P delivered from the original document placing portion 3 is curved downward, reversed, conveyed in the −X direction, and discharged towards a discharge tray 28.

Figure 2:
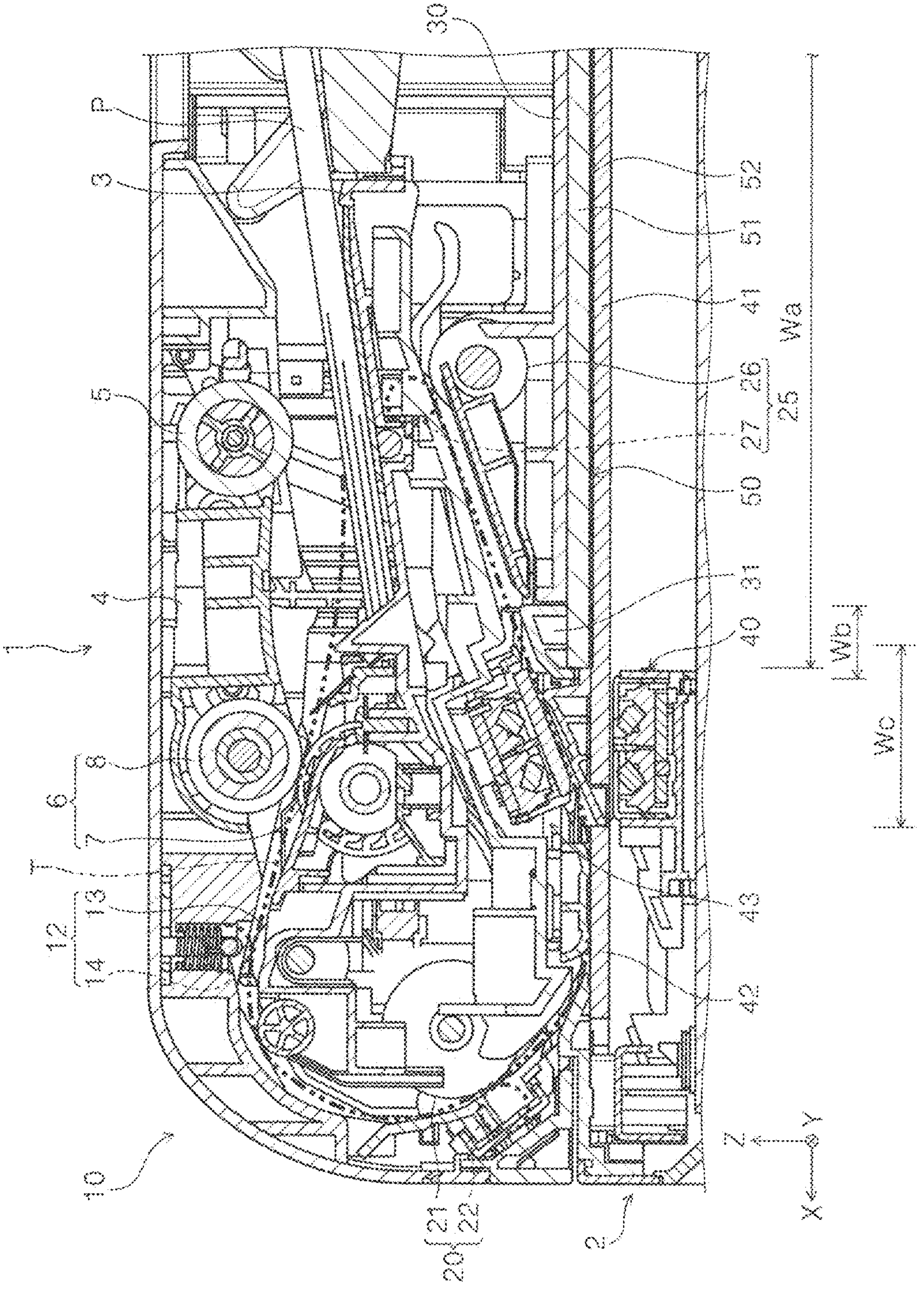
FIG. 2 is a cross-sectional view of an original document conveyance device.

FIG. 2 illustrates an original document conveyance path in the original document conveyance unit 10. In FIG. 2, the original document conveyance path is indicated by an alternating two dots-dashed line with a sign T. The original document conveyance path T is a path from a delivery roller 5 to a third roller pair 25.

The delivery roller 5 is provided at a position facing the original document placing portion 3, the delivery roller 5 feeding the original document P placed on the original document placing portion 3. The delivery roller 5 is provided at a swinging member 4 that is swingable around a center of a rotation axis of a separation roller 8 to be described below, and moves forward and backward relative to the original document P by the swinging of the swinging member 4. The delivery roller 5 is driven clockwise as illustrated in FIG. 2 by a motor (not illustrated).

A feed roller pair 6 is provided downstream of the delivery roller 5. The feed roller pair 6 includes a feed roller 7 that is driven counterclockwise as illustrated in FIG. 2 by a motor (not illustrated), and the separation roller 8 that nips and separates the original document P between the separation roller 8 and the feed roller 7. A first roller pair 12 is provided downstream of the feed roller pair 6. The first roller pair 12 includes a first conveyance roller 13 that is driven counterclockwise as illustrated in FIG. 2 by a motor (not illustrated), and a first counter roller 14 that nips the original document P between the first counter roller 14 and the first conveyance roller 13 and is driven to rotate.

A second roller pair 20 is provided downstream of the first roller pair 12. The second roller pair 20 includes a second conveyance roller 21 that is driven counterclockwise as illustrated in FIG. 2 by a motor (not illustrated), and a second counter roller 22 which nips the original document P between the second counter roller 22 and the second conveyance roller 21 and is driven to rotate.

The scanner main body 2 is located below the original document conveyance unit 10 and includes a first reading unit 40. Each of the first reading unit 40 and a second reading unit 43 to be described below includes a contact image sensor (CIS), is elongated in the Y-axis direction, and reads an image of the original document P.

The first reading unit 40 is provided to be movable in the X-axis direction by a motor (not illustrated). When the original document P is placed on the original document platen glass 41, the first reading unit 40 reads an image of the original document P while moving along the X-axis direction below the original document platen glass 41.

A guide glass 42 is provided in the +X direction relative to the original document platen glass 41. When images of the original document P are read using the original document conveyance unit 10, the first reading unit 40 is disposed below the guide glass 42 and reads the image on a first surface of the original document P being conveyed.

In the original document P having passed through a position facing the guide glass 42, a second surface, that is, a surface opposite to the first surface, is read by the second reading unit 43. The second reading unit 43 is fixedly provided relative to the original document conveyance unit 10.

The third roller pair 25 is provided downstream of the second reading unit 43. The third roller pair 25 includes a third conveyance roller 26 that is driven clockwise as illustrated in FIG. 2 by a motor (not illustrated), and a third counter roller 27 that nips the original document P between the third counter roller 27 and the third conveyance roller 26 and is driven to rotate. The original document P is discharged to the discharge tray 28 (see FIG. 1) by the third roller pair 25.

Each of the feed roller pair 6, the first roller pair 12, the second roller pair 20, and the third roller pair 25 is an example of a conveyance unit capable of conveying an original document.

Next, a pressing portion 50 that presses an original document placed on the original document platen glass 41 will be described. The pressing portion 50 is attached to a pressing plate 30 constituting a bottom portion of the original document conveyance unit 10, and presses the original document placed on the original document platen glass 41 when the original document conveyance unit 10 is in the closed state.

As illustrated in FIG. 2, the pressing portion 50 includes an elastic portion 51 attached to the pressing plate 30, and a sheet material 52 attached to the elastic portion 51 and coming into contact with the original document placed on the original document platen glass 41 when the original document conveyance unit 10 is in the closed state.

The original document platen glass 41 has a longitudinal direction and a short direction, and in the present embodiment, the X-axis direction is the longitudinal direction, and the Y-axis direction is the short direction. The pressing portion 50 has the X-axis direction as a longitudinal direction, and the Y-axis direction as a short direction so as to correspond to such a shape of the original document platen glass 41.

Figure 3:
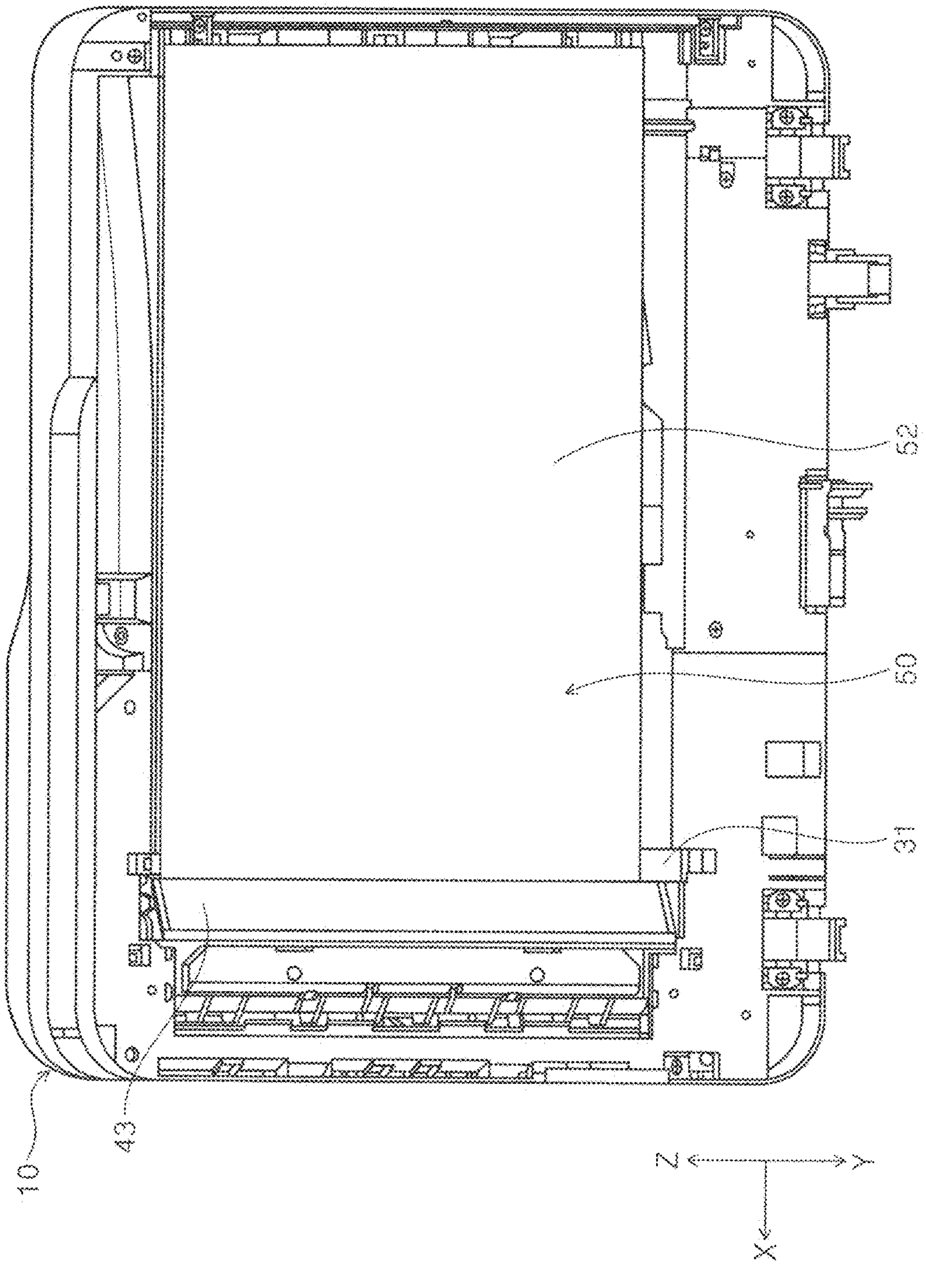
FIG. 3 is a perspective view of the original document conveyance device.

As illustrated in FIG. 3, the second reading unit 43 is exposed at the bottom portion of the original document conveyance unit 10. The second reading unit 43 can be attached to and detached from the original document conveyance unit 10 by removing a holding member 31. The holding member 31 can be attached to and detached from the original document conveyance unit 10. By removing the second reading unit 43, maintenance, replacement, or the like of the second reading unit 43 can be performed.

As illustrated in FIG. 2, a part of the holding member 31 is covered with a part of the pressing portion 50. In FIG. 2, a range Wa is a range of the pressing portion 50 in the X-axis direction. Additionally, a range Wb is a range of the holding member 31 in the X-axis direction. Additionally, a range Wc is a range of the second reading unit 43 in the X-axis direction.

As illustrated in the drawing, the range Wa and the range Wb overlap in the X-axis direction. In addition, the range Wa and the range Wc overlap in the X-axis direction. Further, the range Wb and the range Wc overlap in the X-axis direction.

In other words, when viewed in a normal direction relative to a surface of the sheet material 52, that is, in the Z-axis direction, a part of the pressing portion 50 overlaps a part of the holding member 31. Further, when viewed in the Z-axis direction, a part of the pressing portion 50 overlaps a part of the second reading unit 43.

Therefore, when the holding member 31 is removed in order to remove the second reading unit 43, the pressing portion 50 is to be removed first.

Figure 4:
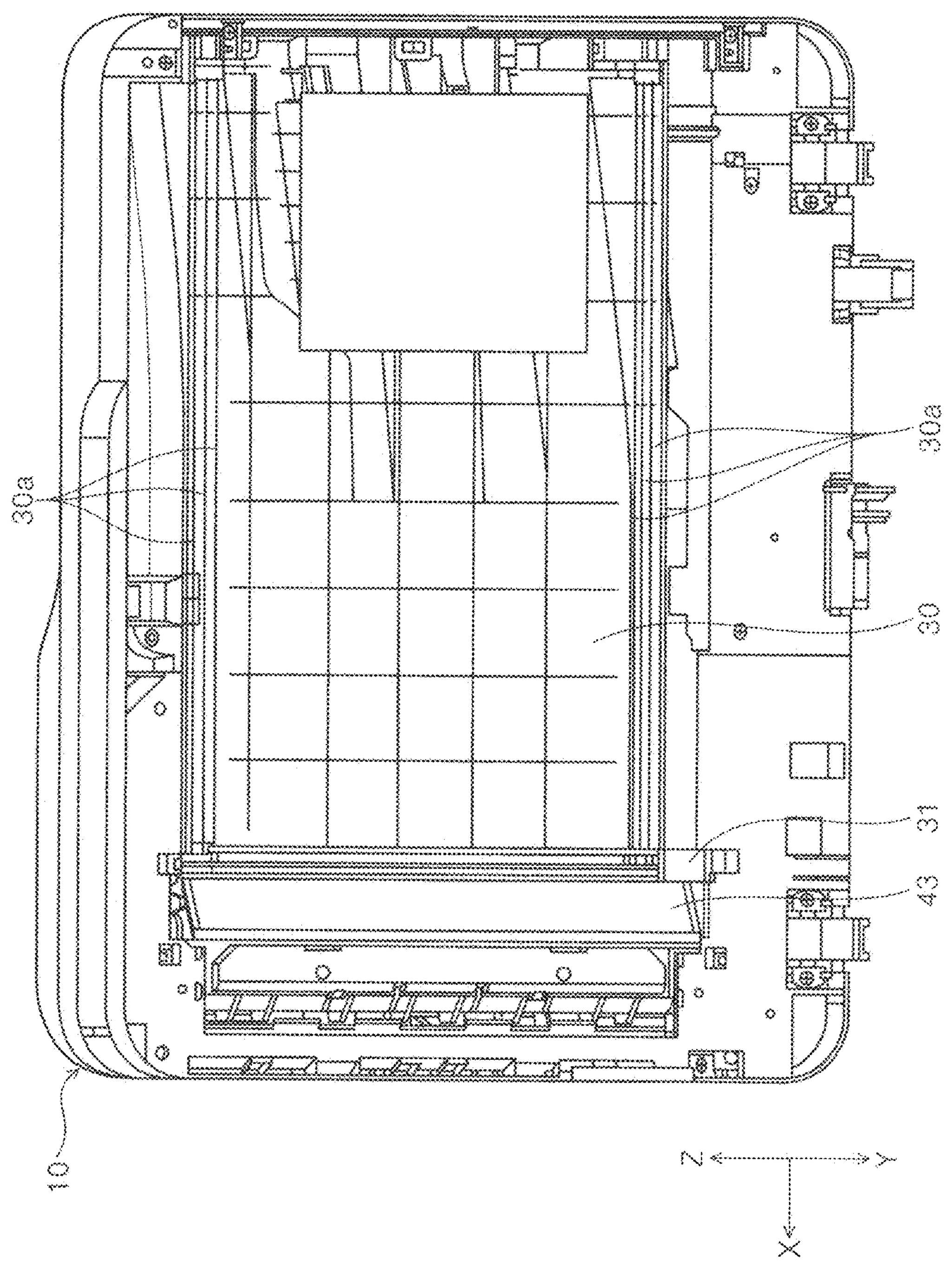
FIG. 4 is a perspective view of the original document conveyance device in a state in which a pressing portion is removed.

As illustrated in FIG. 4, the bottom portion of the original document conveyance unit 10 is constituted by the pressing plate 30. At the pressing plate 30, ribs **30*a* extending in the X-axis direction which is the longitudinal direction are provided at intervals in the Y-axis direction which is the short direction. The ribs 30*a* are provided at an end portion in the +Y direction and an end portion in the −Y direction of the pressing plate 30 in the Y-axis direction. The pressing portion 50 is attached to the rib 30***a* by a bonding portion 53 to be described later.

As illustrated in FIG. 2, the pressing portion 50 includes the elastic portion 51 and the sheet material 52 in this order from the pressing plate 30 toward the original document platen glass 41.

The sheet material 52 is a flexible sheet material having a smooth surface with few irregularities, and for example, a white PP (polypropylene) sheet having a thickness of about 0.2 mm can be used.

As the elastic portion 51, for example, foam having a thickness of about 3.0 to 5.0 mm can be used, and specifically, urethane foam or the like can be used. The elastic portion 51 and the sheet material 52 can be bonded to each other with an adhesive or a double-sided tape (not illustrated).

The sheet material 52 and the elastic portion 51 are formed to have substantially the same area. The adhesive or the double-sided tape for bonding the sheet material 52 and the elastic portion 51 to each other may be used over substantially an entire surface of both the members, or may be locally used at appropriate positions.

As the bonding portion 53 (see FIG. 5) for bonding the pressing plate 30 and the elastic portion 51 to each other, an adhesive or a double-sided tape can be employed, and in the present embodiment, a double-sided tape having a thickness of 0.1 mm is used.

Figure 5:
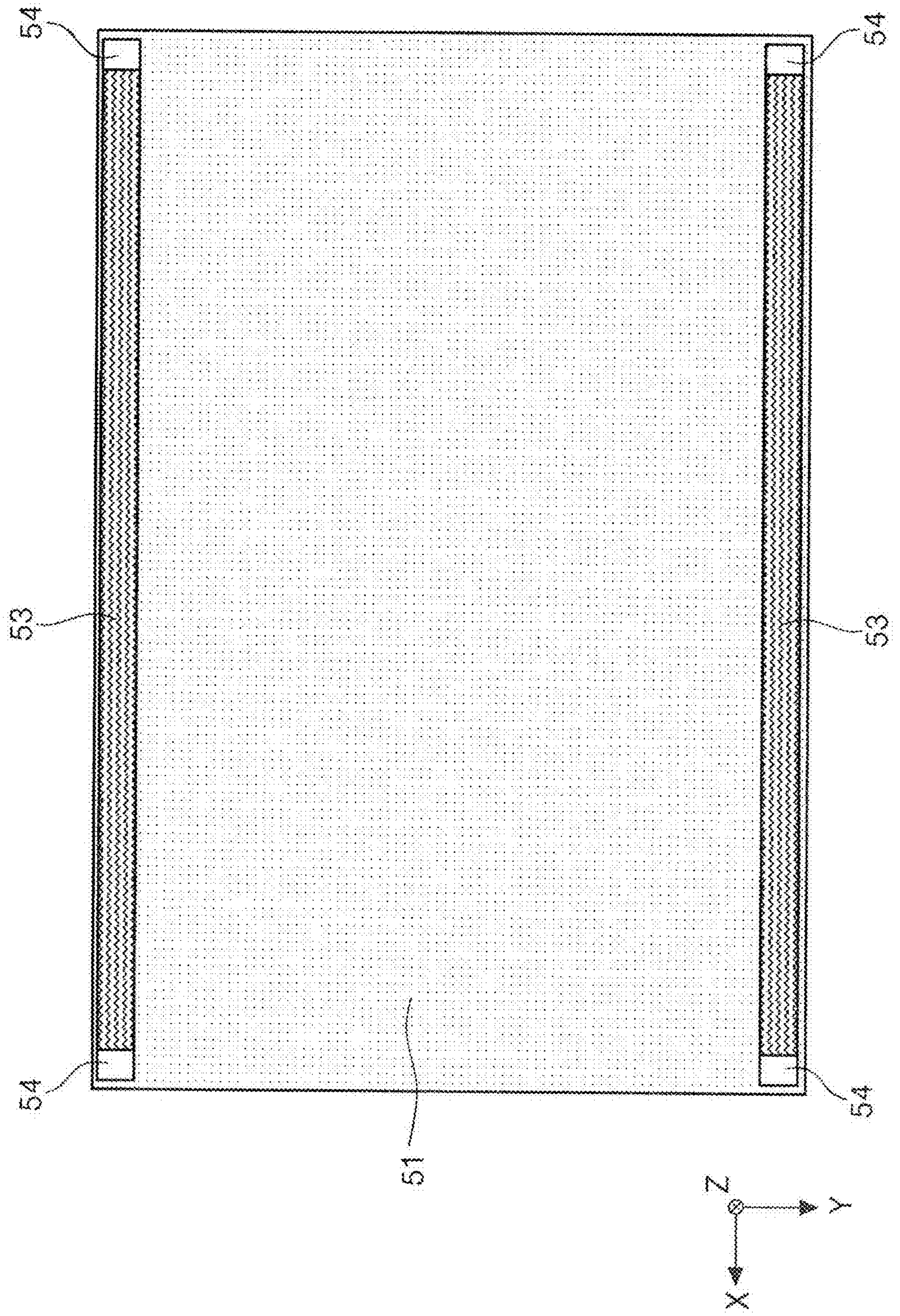
FIG. 5 is a plan view of an elastic portion, a bonding portion, and a bonding inhibiting portion.

As illustrated in FIG. 5, the bonding portion 53 extends along the X-axis direction, that is, the longitudinal direction. Further, the bonding portions 53 are provided at both end portions of the elastic portion 51 in the Y-axis direction, that is, the short direction.

Then, bonding inhibiting portions 54 are provided at both end portions of the bonding portion 53 in the X-axis direction, that is, in the longitudinal direction.

The bonding inhibiting portion 54 is a portion to be attached to the bonding portion 53. The bonding inhibiting portion 54 is interposed between the bonding portion 53 and the rib 30*a* of the pressing plate 30, and inhibits the bonding between the pressing plate 30 and the elastic portion 51.

Figure 6:
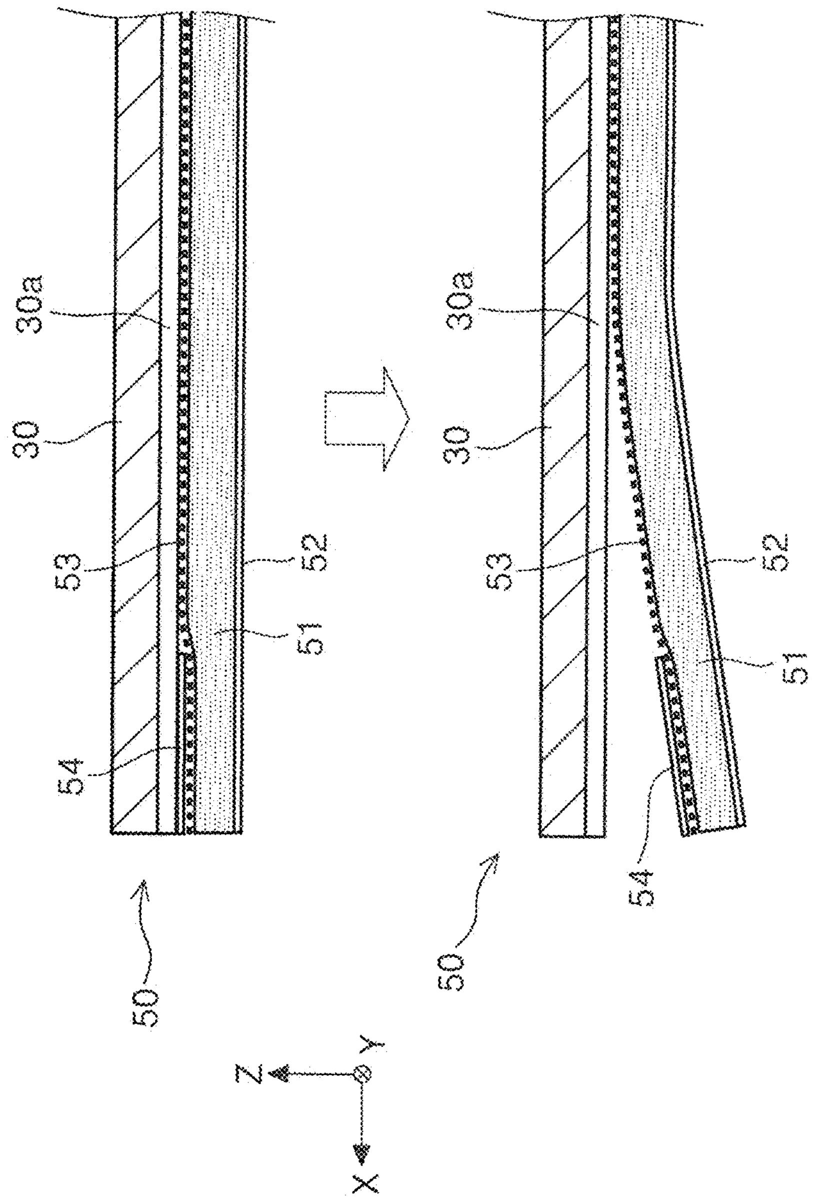
FIG. 6 is a diagram illustrating a state in which the pressing portion is peeled off from a pressing plate with the bonding inhibiting portion as a starting point.

In this way, the bonding inhibiting portion 54 that is interposed between the bonding portion 53 and the original document conveyance unit 10 and inhibits the bonding between the original document conveyance unit 10 and the elastic portion 51 is provided at the end portion of the bonding portion 53. As a result, the elastic portion 51 can be peeled off from the pressing plate 30, that is, the original document conveyance unit 10, with the bonding inhibiting portion 54 as a starting point, as illustrated by a change from an upper drawing to a lower drawing in FIG. 6, while the bonding portion 53 is kept bonded to the elastic portion 51. As a result, it is possible to prevent the elastic portion 51 from being torn when the elastic portion 51 is peeled off from the original document conveyance unit 10.

In addition, in the present embodiment, the pressing portion 50 has the longitudinal direction and the short direction, the bonding portion 53 extends in the longitudinal direction, and the bonding inhibiting portion 54 is provided at at least one of one end portion and another end portion of the bonding portion 53 in the longitudinal direction.

In the configuration in which the pressing portion 50 has the longitudinal direction and the short direction and the bonding portion 53 extends in the longitudinal direction, when the elastic portion 51 is peeled off from the original document conveyance unit 10 along the longitudinal direction, workability is improved.

According to the present embodiment, in such a configuration, since the bonding inhibiting portion 54 is provided at at least one of the one end portion and the other end portion in the longitudinal direction of the bonding portion 53, the elastic portion 51 can be peeled off from the original document conveyance unit 10 with the bonding inhibiting portion 54 as the starting point with easy workability.

Note that in the present embodiment, as illustrated in FIG. 5, the bonding inhibiting portion 54 is provided at each of both the end portions of the bonding portion 53 in the X-axis direction, that is, the longitudinal direction, but may be provided at the end portion on any one side.

In addition, the bonding inhibiting portion 54 may also be provided at at least one of the end portion on one side and the end portion on another side of the bonding portion 53 in the Y-axis direction, that is, the short direction.

In addition, in the present embodiment, the bottom portion of the original document conveyance unit 10 includes the rib 30*a* which is bonded to the bonding portion 53 and extends along the longitudinal direction, and the plurality of the ribs 30*a* are provided at intervals in the short direction.

Since the bonding portion 53 is bonded to the rib 30*a* provided at the bottom portion in this manner, the bonding portion 53 can be easily peeled off from the bottom portion of the original document conveyance unit 10. In addition, since the plurality of ribs 30*a* are provided at intervals in the short direction, it is possible to ensure bonding strength.

In addition, in the present embodiment, the plurality of bonding portions 53 are provided at intervals in the short direction. Thus, the elastic portion 51 can be reliably bonded to the original document conveyance unit 10.

Note that in the present embodiment, the bonding portion 53 is provided at each of both the end portions of the elastic portion 51 in the short direction, but may be further provided between both the end portions.

In addition, in the present embodiment, the bonding inhibiting portion 54 is formed of the same material as the sheet material 52. Thus, the bonding inhibiting portion 54 can be easily achieved with a simple configuration. In addition, since the bonding inhibiting portion 54 is the sheet material 52, it is possible to suppress influence on a thickness of the pressing portion 50 and to appropriately press an original document.

Note that the bonding inhibiting portion 54 is not limited to the sheet material 52, but may be any material as long as the material can inhibit the elastic portion 51 from being bonded to the pressing plate 30, that is, the original document conveyance unit 10.

For example, a large number of convex portions may be provided at the pressing plate 30 to reduce bonding areas, and the convex portions may be used as bonding inhibiting portions.

In addition, in the present embodiment, the original document conveyance unit 10 includes the second reading unit 43 and the holding member 31 as the detachable portions that are detachable. Then, as described with reference to FIGS. 2 and 3, at least a part of the pressing portion 50 overlaps at least a part of the detachable portion when viewed from the normal direction relative to the surface of the sheet material 52.

In such a configuration, it is necessary to remove the pressing portion 50 when the detachable portion is attached or detached. At this time, due to the operational effects of the bonding inhibiting portion 54 described above, it is possible to prevent the elastic portion 51 from being torn when the elastic portion 51 is peeled off from the original document conveyance unit 10.

Note that the above detachable portion is not limited to the second reading unit 43 or the holding member 31, and may be a roller provided in the original document conveyance path.

Further, the above detachable portion may be a jam release cover for opening the original document conveyance path. In this case, when an original document jam occurs in the original document conveyance path, the jam release cover is to be opened, and at that time, it is necessary to remove the pressing portion 50 from the original document conveyance unit 10. At this time, since the bonding inhibiting portion 54 is provided, it is possible to prevent the elastic portion 51 from being torn.

The present disclosure is not limited to the above-described embodiment, various modifications can be made within the scope of the disclosure as described in the claims, and it is needless to say that the modifications also fall within the scope of the present disclosure.

What is claimed is:

1. An image reading device, comprising:

an original document platen at which an original document is placeable;

a reading unit configured to read the original document placed at the original document platen;

a cover portion configured to be switchable between a closed state for covering the original document platen, and an open state for opening the original document platen; and a pressing portion provided at the cover portion, and configured to press the original document placed at the original document platen when the cover portion is in the closed state, wherein the pressing portion has a longitudinal direction and a short direction, the pressing portion includes an elastic portion bonded to a bottom portion of the cover portion, a sheet material attached to the elastic portion, and coming into contact with the original document placed at the original document platen when the cover portion is in the closed state, a bonding portion for bonding the cover portion and the elastic portion, and a bonding inhibiting portion interposed between the bonding portion and the cover portion, and inhibiting the bonding between the cover portion and the elastic portion, the bonding inhibiting portion having a length along the longitudinal direction shorter than an entire length of the bonding portion extending along the longitudinal direction, and the bonding inhibiting portion is provided at an end portion of the bonding portion.

2. The image reading device according to claim 1, wherein the bonding portion extends in the longitudinal direction, and the bonding inhibiting portion is provided at at least one of one end portion and another end portion in the longitudinal direction of the bonding portion.

3. The image reading device according to claim 2, wherein the bottom portion of the cover portion includes a rib bonded to the bonding portion and extending along the longitudinal direction, and a plurality of the ribs are provided at intervals in the short direction.

4. The image reading device according to claim 3, wherein the bonding portion extends along the rib of the cover portion, and the bonding inhibiting portion overlaps the rib.

5. The image reading device according to claim 2, wherein a plurality of the bonding portions are provided at intervals in the short direction.

6. The image reading device according to claim 1, wherein the bonding inhibiting portion includes a sheet material.

7. The image reading device according to claim 1, wherein the cover portion includes a conveyance unit configured to convey the original document.

8. The image reading device according to claim 7, wherein the cover portion includes a detachable portion that is detachable, and at least a part of the pressing portion overlaps at least a part of the detachable portion when viewed from a normal direction relative to a surface of the sheet material.

9. The image reading device according to claim 8, wherein the detachable portion is the reading unit.

10. A recording device, comprising:

a device main body including a recording unit that performs recording on a medium; and the image reading device according to claim 1 provided at an upper portion of the device main body.

* * * * *